United States Patent
Stulberger

(10) Patent No.: US 10,473,950 B2
(45) Date of Patent: Nov. 12, 2019

(54) APPARATUS THAT IMPROVES VISION

(71) Applicant: Gerald Stulberger, Hewlett, NY (US)

(72) Inventor: Gerald Stulberger, Hewlett, NY (US)

(*) Notice: Subject to any disclaimer, the term of this patent is extended or adjusted under 35 U.S.C. 154(b) by 31 days.

(21) Appl. No.: 15/710,755

(22) Filed: Sep. 20, 2017

(65) Prior Publication Data
US 2018/0081195 A1    Mar. 22, 2018

Related U.S. Application Data

(60) Provisional application No. 62/397,281, filed on Sep. 20, 2016.

(51) Int. Cl.
G02C 5/08   (2006.01)
G02C 5/22   (2006.01)
G02C 5/00   (2006.01)

(52) U.S. Cl.
CPC .......... *G02C 5/2263* (2013.01); *G02C 5/001* (2013.01); *G02C 5/006* (2013.01); *G02C 5/08* (2013.01)

(58) Field of Classification Search
CPC ....... G02C 5/008; G02C 5/2263; G02C 5/001
USPC ................... 351/41, 55, 57, 59, 153
See application file for complete search history.

(56) References Cited

U.S. PATENT DOCUMENTS

| | | | | |
|---|---|---|---|---|
| 771,067 | A * | 9/1904 | Heeren | G02C 1/08 351/121 |
| 4,547,048 | A * | 10/1985 | Negishi | G02C 5/124 351/115 |
| 9,239,470 | B2 * | 1/2016 | Vossoughi | G02C 5/146 |
| 2005/0264752 | A1 * | 12/2005 | Howell | G02C 5/001 351/41 |
| 2006/0256282 | A1 | 11/2006 | Nakanishi | |
| 2010/0053544 | A1 * | 3/2010 | Beasley | G02C 7/06 351/54 |
| 2011/0205483 | A1 * | 8/2011 | Margolis | G02C 1/06 351/86 |
| 2013/0293826 | A1 * | 11/2013 | Batey | G02C 5/001 351/62 |

* cited by examiner

*Primary Examiner* — Darryl J Collins
(74) *Attorney, Agent, or Firm* — Integrity Patent Group, PLC; Charles Runyan

(57) ABSTRACT

An apparatus includes a frame, a left temple, a right temple, a left end piece, a right end piece, a left hinge, and a right hinge. The frame includes a left side and a right side and the frame may support a plurality of lens. The frame of the apparatus that improves vision may be tilted to provide the lenses at varying angles and lock into place via a latching mechanism. The effect of the tilted lens provides significantly increased clarity and definition of vision, with no expensive custom lenses or magnification.

19 Claims, 4 Drawing Sheets

APPARATUS THAT IMPROVES VISION

CROSS REFERENCE TO RELATED APPLICATION

The present application is related to and claims priority to U.S. Provisional Patent Application No. 62/397,281 filed Sep. 20, 2016, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

1. Field of the Invention

The present invention relates generally to the field of eyewear and more specifically relates to rotatable eyeglasses.

2. Description of Related Art

A corrective lens is a lens worn in front of an eye, mainly used to treat myopia, hyperopia, astigmatism, and presbyopia. Glasses are worn on the face a short distance in front of the eye to improve sight. People using a typical pair of magnifier readers or glasses to read have found that by tipping a pair of glasses to a different angle will substantially decrease the amount of eye fatigue and also improve eye focus. Unfortunately, a typical pair of reading glasses is designed using a ridged mounting point at the point where the lenses are attached to the temple portion of the eyeglass frame. Because of this typical design of eyeglass frame work when a user tips a pair of glasses about his/her head and face to improve the lens angle for better eye comfort and focus the eyeglasses are perched in an unstable position on the user's head and the user is constantly having to adjust or hold the eyeglasses from falling off entirely. A suitable solution is desired.

U.S. Pub. No. 2006/0256282 to Eiichi Nakanishi relates to a frame of a pair of multiple-focus spectacles. The described frame of a pair of multiple-focus spectacles includes a frame of a pair of multiple-focus spectacles which has temples, each connected by a vertical swiveling mechanism with a horizontal pivot, to a web on the outer side of a forward frame part. A retainer built in this mechanism has a pawl adjoining to the frame part, and an arcuate row of notches are formed within the temple around the pivot so as to alternatively engage with the pawl. A compression spring urges the pawl to be retained in the chosen notch, and the temple can be pulled simply against the spring so that the pawl disengages from one notch and then engages with another notch. Each temple is surely retained either at any downwardly slanted position or at the normal straight position relative to the frame part.

BRIEF SUMMARY OF THE INVENTION

In view of the foregoing disadvantages inherent in the known eyewear art, the present disclosure provides a novel apparatus that improves vision. The general purpose of the present disclosure, which will be described subsequently in greater detail, is to provide an apparatus that improves vision allowing a user to pivot lenses to a desired angle.

The disclosed apparatus that improves vision includes a frame, a left temple, a right temple, a left end piece, a right end piece, a left hinge, and a right hinge. The frame includes a left side and a right side and the frame may support a plurality of lenses. The left temple includes an elongate body having a first end and a second end. The second end of the left temple is removably attached to the left side of the frame. The right temple includes an elongate body and has a first end and a second end, and the second end of the right temple is removably attached to the right side of the frame. The left end piece is rotatably positioned between the left side of the frame and the second end of the left temple. The right end piece is rotatably positioned between the right side of the frame and the second end of the right temple. The left hinge being may be positioned in a middle portion of the d body of the left temple. The right hinge may be positioned in a middle portion of the elongate body of the right temple.

The apparatus having means to tilt a lens provides significantly increased clarity and definition of vision, with no expensive custom lenses or magnification. The device eases eyestrain when reading small text or viewing fine detailed items by providing pivoting eyewear.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, an apparatus that improves vision, constructed and operative according to the teachings of the present disclosure.

The various embodiments of the present invention will hereinafter be described in conjunction with the appended drawings, wherein like designations denote like elements.

DETAILED DESCRIPTION

As discussed above, embodiments of the present disclosure relate to axially rotatable eyewear and more particularly to an apparatus that improves vision as used to improve the use of eyeglasses by providing adjustable lenses for improving sight (the efficient use of sight).

Generally speaking, the apparatus that improves vision has the ability to tilt and stop and secure the lenses into place by means of stops on a rotating shaft. A tilt angle position, may include three angles in the 40-60 or 70-80 degree range tilted forward, as desired by the wearer of the glasses. The lenses then may be released with a light push forward, thereby disengaging the stops on the rotating shaft, once the wearer no longer desires the tilt effect.

The effect of the tilted lens provides significantly increased clarity and definition of vision, with no expensive custom lenses or magnification. The device also significantly eases eyestrain when reading fine print, viewing fine textures, cellphones screens or tablet screens. The apparatus may increase clarity and readability in dimmed lighting as well.

The stops on the rotating shaft may interact with a stop most likely projected on the casing itself, to meet the stop on the shaft and allow for the click and hold effect, and then the push forward and release effect, re-engaging the shaft with the spring. The spring may be a 'coil' type spring; other suitable equivalents may be used. The click-stop mechanisms will also allow the glasses lenses to be restored to the standard vertical position so that the eyeglasses can be folded and stowed away in its flat-fold storage case as originally designed. Other features may be included to allow for the frames to fold in half, whereby already folding flat, an additional fold may allow for the frames to fold down to a 'credit-card' size, combined with its thin casing, would be a credit-card sized casing, to fit into a wallet. Additionally, some of these modifications may apply to the non-flat-folding glasses such that non-prescription readers and prescription eyeglasses may include features of the present invention.

Figure 1:
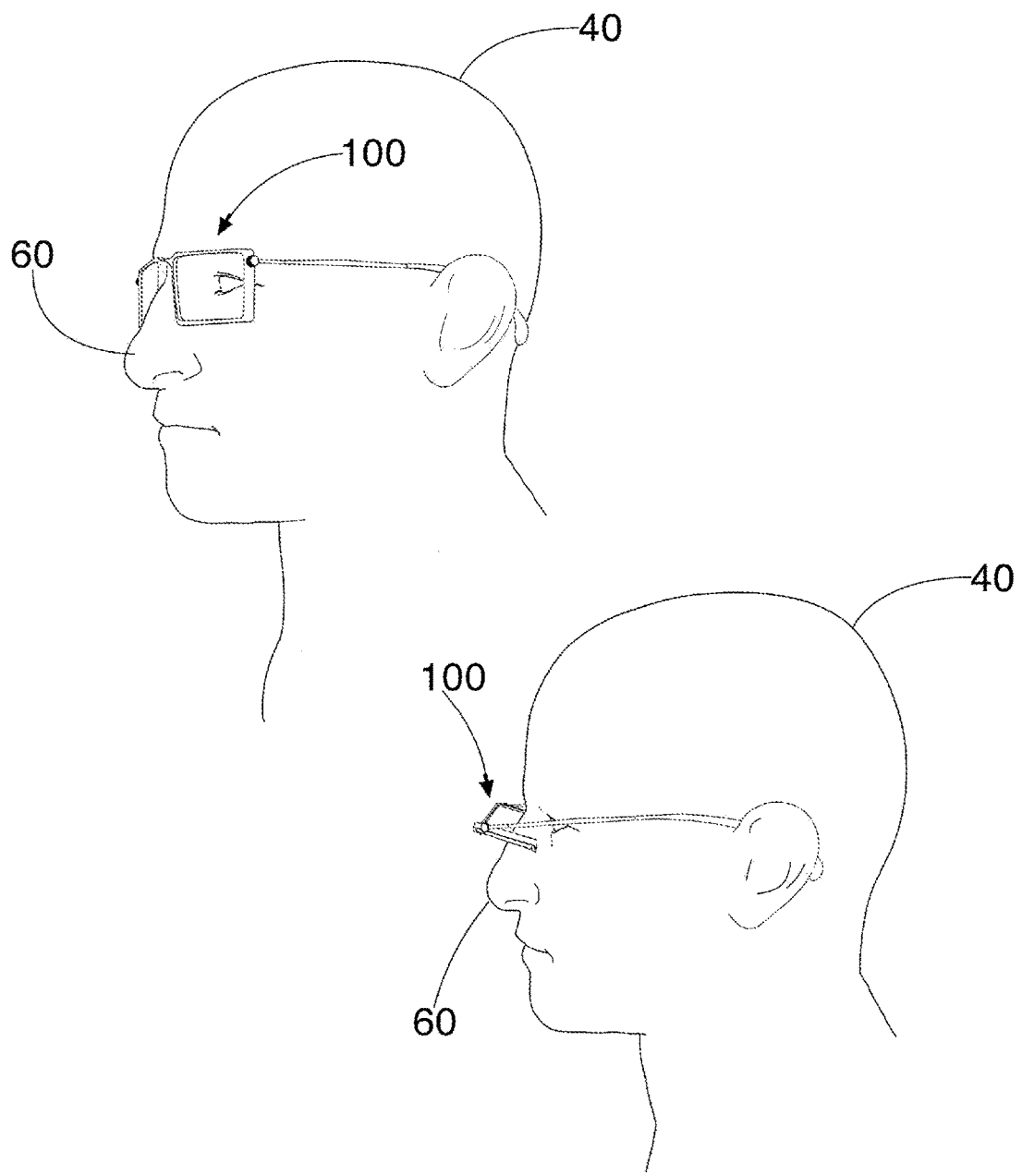
FIG. 1 is a perspective view of the apparatus that improves vision during an 'in-use' condition, according to an embodiment of the disclosure.

Referring now more specifically to the drawings by numerals of reference, there is shown in FIGS. 1-4, various views of an apparatus that improves vision 100. FIG. 1 shows an apparatus that improves vision 100 during an 'in-use' condition, according to an embodiment of the present disclosure.

As illustrated, the apparatus that improves vision 100 includes a frame 110, a left temple 118, a right temple 126, a left end piece 134, a right end piece 136, a left hinge 138, and a right hinge 142. The frame 110 includes a left side 112 and a right side 114 and the frame 110 may support a plurality of lens 116. The left temple 118 includes an elongate body 120 having a first end 122 and a second end 124. The second end 124 of the left temple 118 is removably attached to the left side 112 of the frame 110. The right temple 126 includes an elongate body 128 and has a first end 130 and a second end 132. The second end 132 of the right temple 126 is removably attached to the right side 114 of the frame 110. The left end piece 134 is rotatably positioned between the left side 112 of the frame 110 and the second end 124 of the left temple 118. The right end piece 136 is rotatably positioned between the right side 114 of the frame 110 and the second end 132 of the right temple 126. The left hinge 138 being positioned in a middle portion 140 of the elongate body 120 of the left temple 118. The right hinge 142 being positioned in a middle portion 144 of the elongate body 128 of the right temple 126.

Figure 2:
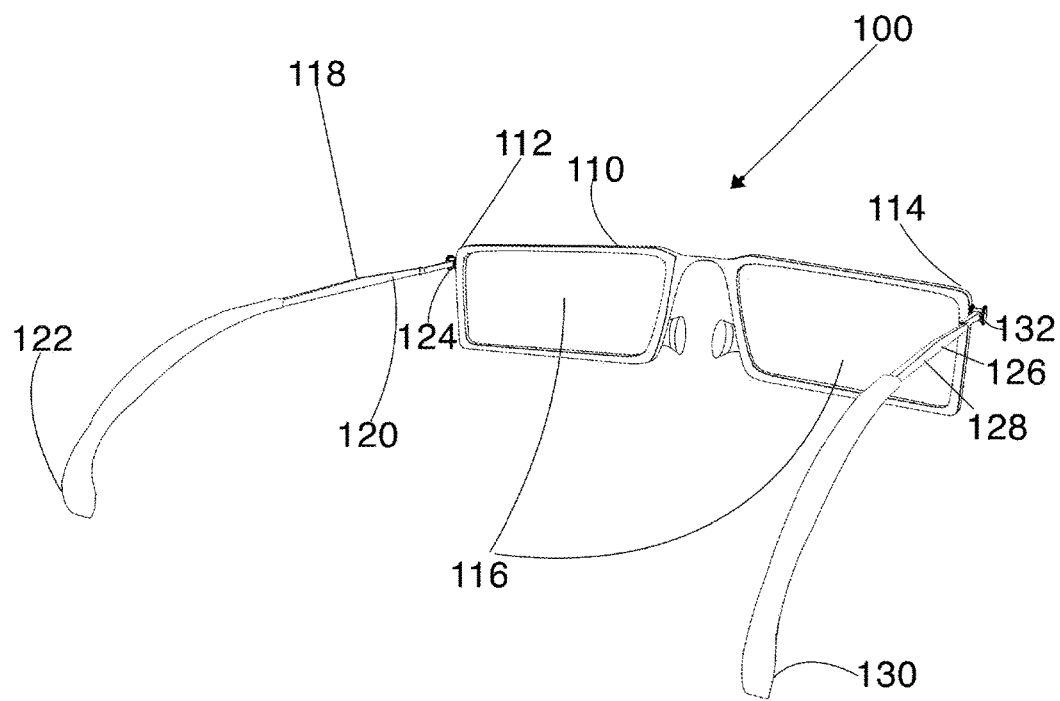
FIG. 2 is a perspective view of the apparatus that improves vision of FIG. 1, according to an embodiment of the present disclosure.

FIG. 2 shows a perspective view of the apparatus that improves vision 100 of FIG. 1, according to an embodiment of the present disclosure. As above, the apparatus 100 includes the frame 110, the left temple 118, the right temple 126, the left end piece 134, the right end piece 136, the left hinge 138, and the right hinge 142. The frame 110 of the apparatus that improves vision 100 is configured to be tilted from a first position to a plurality of positions using a latching mechanism. The latching mechanism may comprise a plurality of protruding members 146 including teeth or stops. The apparatus 100 further includes a left nose pad 148 and a right nose pad 150 configured to rest on a nose 60 of a user 40. The left nose pad 148 and the right nose pad 150 are configured to be horizontally adjusted. The left nose pad 148 and the right nose pad 150 are configured to be vertically adjusted. The plurality of positions of tilt is incremental. One of the plurality of positions of tilt includes an angle measuring between 40 degrees and 60 degrees in relation to a face of a user 40. Other angles may be used.

Figure 3:
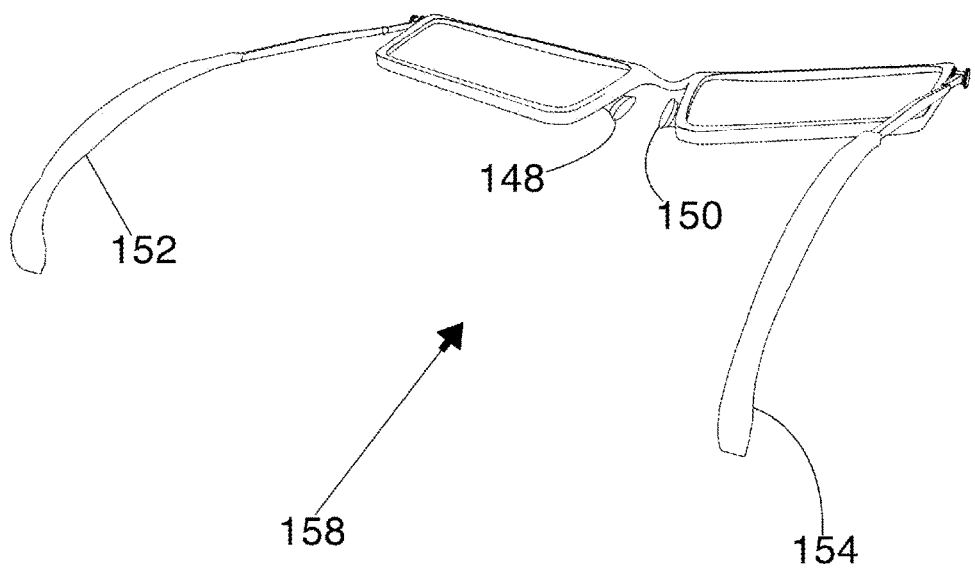
FIG. 3 is a perspective view of the apparatus that improves vision of FIG. 1, according to an embodiment of the present disclosure.

FIG. 3 shows a perspective view of the apparatus that improves vision 100 of FIG. 1, according to an embodiment of the present disclosure. As above, the apparatus that improves vision 100 includes the frame 110 configured to support a plurality of lens 116. The plurality of lenses 116 may be auto-dimming lenses. In a preferred embodiment, the plurality of lenses 116 are removable and scratch-resistant. The plurality of lenses 116 are configured to provide ultra-violet ray protection. The plurality of lenses 116 may be shatter-proof lenses having an anti-glare coating.

Figure 4:
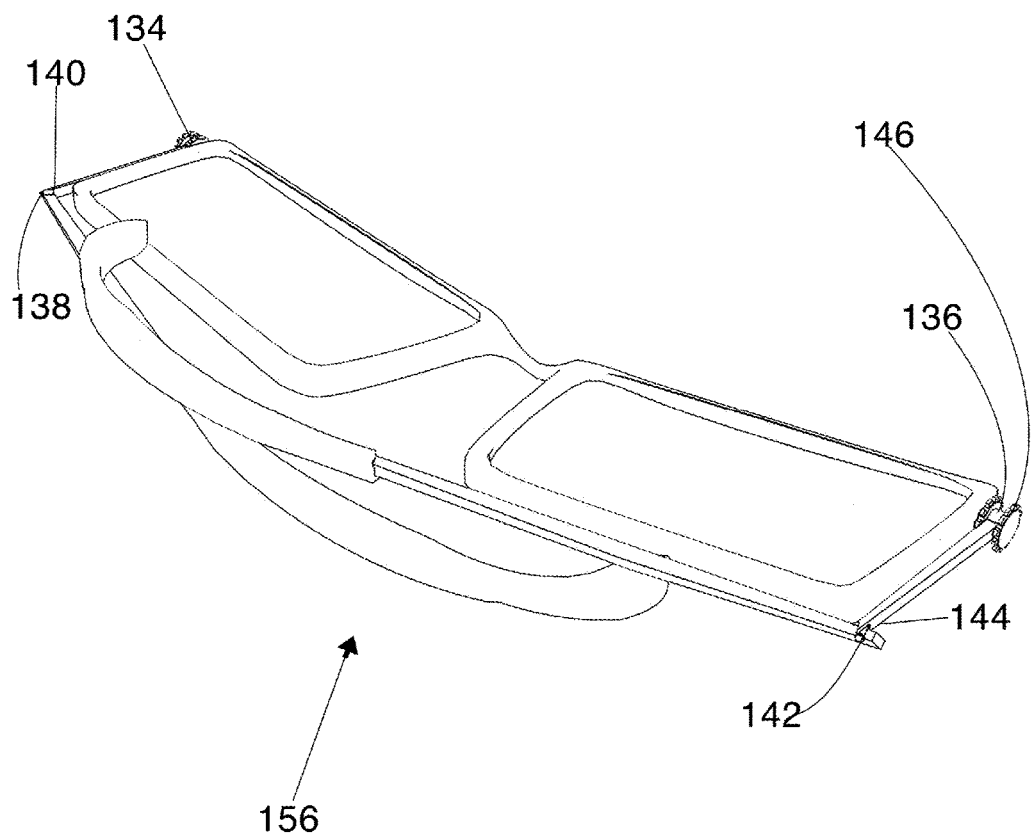
FIG. 4 is a perspective view of the apparatus that improves vision of FIG. 1, according to an embodiment of the present disclosure.

FIG. 4 shows a perspective view of the apparatus that improves vision 100 of FIG. 1, according to an embodiment of the present disclosure. As above, the apparatus that improves vision 100 is foldable. The apparatus 100 further comprises a left temple cover 152; the left temple cover 152 may be removably attached to the first end 122 of the left temple 118 and configured to provide padding to a left ear of a user 40. The apparatus may further include a right temple cover 154; the right temple cover 154 is removably attached to the first end 130 of the right temple 126 and configured to provide padding to a right ear of the user 40. The left hinge 138 and the right hinge 142 are configured to provide pivotal movement of the left temple 118 and of the right temple 126 from an open configuration to a closed configuration and from a closed configuration to an open configuration. A method of use may include using the described apparatus to promote ease of vision via tilting to provide the lenses at varying angles relative to the eye and lock into place via a latching mechanism.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. Eyeglasses comprising
   a frame having a frame front and lens mounted in the front, a left temple with a left elongate body connected to the left side of the frame, and a right temple with a right elongate body connected to the right side of the frame,
   wherein the front or the lenses tilt on a pivot axis from a first position to a pantoscopically tilted position using a latching mechanism, wherein the front or the lenses tilt on a pivot axis from a first position to a fold-flat position in which the left temple, the left elongate body, the right temple, and the right elongate body lie in a plane containing the frame, and wherein—the pivot axis lies in a plane defined by the front of the lenses.

2. The eyeglasses of claim 1, wherein said latching mechanism comprises a protruding member.

3. The eyeglasses of claim 2, wherein the protruding member includes a tooth or a stop.

4. The eyeglasses of claim 3 comprising a plurality of the protruding member.

5. The eyeglasses of claim 4, wherein the tilted position encompasses a plurality of positions.

6. The eyeglasses of claim 5, wherein one of the tilted positions has a tilt angle measuring 40-80, 40-60, or 70-80 degrees from a first position.

7. The eyeglasses of claim 6 wherein one of the tilted positions has a tilt angle measuring 40-60 or 70-80 degrees from a first position.

8. The eyeglasses of claim 7 further comprising a rotating shaft disposed between the front and a right or left temple.

9. The eyeglasses of claim 8 further comprising a hinge disposed between an anterior and posterior section of the temple.

10. The eyeglasses of claim 9 wherein the hinge is disposed nearer the anterior end of the temple than to the posterior end of the temple.

11. The eyeglasses of claim 10, wherein said eyeglasses are fold flat or fold completely flat.

12. The eyeglasses of claim 5 wherein one of the tilted positions has a tilt angle measuring 40-80, 40-60, or 70-80 degrees from a user's face.

13. The eyeglasses of claim 5 wherein one of the tilted positions has a tilt angle measuring 40-80, 40-60, or 70-80 degrees from vertical.

14. The eyeglasses of claim 1 further comprising a rotating shaft disposed between the front and a right or left temple.

15. The eyeglasses of claim 14 wherein the rotating shaft comprises a tooth or a stop.

16. The eyeglasses of claim 15 wherein the tilted position encompasses a plurality of positions.

17. The eyeglasses of claim 16 wherein one of the tilted positions has a tilt angle measuring 40-60 or 70-80 degrees from a first position.

18. The eyeglasses of claim 17 further comprising a hinge disposed between an anterior and posterior section of the temple.

19. The eyeglasses of claim 18 wherein the rotating shaft is disposed between the hinge and an anterior end of the temple.

* * * * *